(12) United States Patent
Vergara et al.

(10) Patent No.: US 7,461,774 B2
(45) Date of Patent: Dec. 9, 2008

(54) CUSTOMER INTERACTION PROCESS AND SYSTEM

(75) Inventors: Alexander Vergara, Concord, NH (US); Harold Turner, Goffstown, NH (US)

(73) Assignee: Advantage Branch & Office Systems, LLC, Concord, NH (US)

( * ) Notice: Subject to any disclaimer, the term of this patent is extended or adjusted under 35 U.S.C. 154(b) by 0 days.

(21) Appl. No.: 11/224,698

(22) Filed: Sep. 12, 2005

(65) Prior Publication Data

US 2006/0060647 A1   Mar. 23, 2006

Related U.S. Application Data

(60) Provisional application No. 60/608,821, filed on Sep. 10, 2004.

(51) Int. Cl.
*G06Q 40/00*   (2006.01)
*G06Q 30/00*   (2006.01)
*G07G 1/14*   (2006.01)

(52) U.S. Cl. .......................................... 235/379; 705/14
(58) Field of Classification Search ................ 235/379, 235/380, 375, 385; 705/9, 42–44, 30, 35, 705/38, 14, 50, 51
See application file for complete search history.

(56) References Cited

U.S. PATENT DOCUMENTS

| | | | | |
|---|---|---|---|---|
| 5,195,133 | A * | 3/1993 | Kapp et al. | 235/379 |
| 5,600,114 | A * | 2/1997 | Dunlap et al. | 235/379 |
| 5,602,933 | A * | 2/1997 | Blackwell et al. | 382/116 |
| 5,606,496 | A | 2/1997 | D'Agostino | |
| 5,970,888 | A * | 10/1999 | Sheppard | 109/10 |
| 6,073,119 | A * | 6/2000 | Bornemisza-Wahr et al. | 705/42 |
| 6,286,758 | B1 | 9/2001 | Dejaeger et al. | |
| 6,629,636 | B1 * | 10/2003 | Hayashi et al. | 235/379 |
| 6,681,985 | B1 * | 1/2004 | Curtin et al. | 235/379 |
| 7,058,603 | B1 * | 6/2006 | Rhiando | 705/50 |
| 2001/0007332 | A1 * | 7/2001 | Kjonaas et al. | 235/379 |
| 2003/0078840 | A1 * | 4/2003 | Strunk et al. | 705/14 |
| 2005/0060218 | A1 * | 3/2005 | Coutts et al. | 705/9 |
| 2005/0240515 | A1 * | 10/2005 | Fenstermaker | 705/38 |
| 2005/0246252 | A1 * | 11/2005 | Wallace et al. | 705/30 |
| 2005/0263590 | A1 | 12/2005 | Branck et al. | |
| 2006/0004660 | A1 * | 1/2006 | Pranger | 705/43 |
| 2006/0289629 | A1 * | 12/2006 | Smith et al. | 235/379 |

OTHER PUBLICATIONS

International Search Report with Written Opinion dated Nov. 2, 2006 received in corresponding International Application Serial No. PCT/US05/32665 (12 pages).

(Continued)

*Primary Examiner*—Thien M. Le
*Assistant Examiner*—Thien T Mai
(74) *Attorney, Agent, or Firm*—Grossman Tucker Perreault & Pfleger, PLLC (57) ABSTRACT

A customer interaction process may include conducting various activities at customer interaction console in addition to banking transactions. The customer interaction process may include retrieving customer account information associated with the customer and conducting a customer service activity with the customer at the console using the account information. The customer interaction process may also include retrieving banking product information associated with a banking product and conducting at least one sales activity using the banking product information. The customer interaction process may also include providing marketing information to customers at the customer interaction console. A customer interaction system includes various office and electronic components used to implement the customer interaction process.

29 Claims, 8 Drawing Sheets

OTHER PUBLICATIONS

U.S. Office Action Summary dated Oct. 6, 2006 received in related U.S. Appl. No. 11/224,724, filed Sep. 12, 2005 (12 pages).

Notice of Allowance dated Dec. 4, 2007, received in U.S. Appl. No. 11/224,724, 7 pgs.

* cited by examiner

CUSTOMER INTERACTION PROCESS AND SYSTEM

CROSS-REFERENCE TO RELATED APPLICATIONS

This application claims the benefit of co-pending U.S. Provisional patent application Ser. No. 60/608,821, filed on Sep. 10, 2004, which is fully incorporated herein by reference. This application is also related to co-pending U.S. patent application Ser. No. 11/224,724 entitled CUSTOMER INTERACTION CONSOLE AND CONFIGURABLE CONSOLE SYSTEM and U.S. patent application Ser. No. 11/224,725 entitled MULTI-POSITION CHAIR, both of which are filed concurrently herewith and are fully incorporated herein by reference.

TECHNICAL FIELD

The present invention relates to customer interaction processes and systems and more particularly, to customer interaction processes and systems for use in branch banking.

BACKGROUND INFORMATION

A successful business may depend on the office environment in which the business' employees work and in which customers interact with the business. Employees are generally more productive in a safe and comfortable workplace and in a rewarding job. Customers are generally more satisfied when interacting with pleasant employees in an efficient and customer-friendly manner. Existing office environments and processes for customer interaction have some shortcomings that result in unhappy employees and unhappy customers and as a result, a less successful business.

In a branch office of a bank, for example, the traditional customer interaction process and the traditional office environment have some shortcomings. For basic banking transactions (e.g., deposits, withdrawals and cashing checks), the customer meets with a teller who is generally trained only to perform these basic banking transactions. Traditional bank tellers at a traditional teller console have limited access to information for customers and a limited ability to provide additional services to the customer. For customer service and purchasing additional bank products, the customer generally meets with a separate customer service representative or other bank worker at a different location within the bank. For marketing materials, the customer may be presented with pre-printed brochures positioned at various locations within the bank.

As a result of this traditional customer interaction process, both the bank employees and customers may be unsatisfied. The tellers are often unhappy with the monotonous and unrewarding job of handling only basic transactions. Customers are often inconvenienced by the limited information and capabilities at the teller console and may have an unpleasant experience because of an unhappy teller. Customer's also have difficulty obtaining current marketing materials (e.g., with current interest rates) directed specifically at the customer's needs.

The existing console arrangement also may not provide the customer with adequate privacy. When the teller provides the customer with sensitive information involving the customer's account, for example, that information may be overheard by other customers. Federal laws require banks to protect consumer's financial private information from unauthorized access.

BRIEF DESCRIPTION OF THE DRAWINGS

These and other features and advantages will be better understood by reading the following detailed description, taken together with the drawings wherein.

DETAILED DESCRIPTION

Customer interaction systems and processes, consistent with embodiments of the present invention, are described in greater detail below. Although the embodiments are described in the context of a branch office of a bank, many of the embodiments and concepts of the present invention may be used in other types of businesses and office environments. Embodiments of the components of the customer interaction system are also described below. Although the components are described in the context of a system, each of the components may be provided and used separately from the system and the other components.

Figure 1:
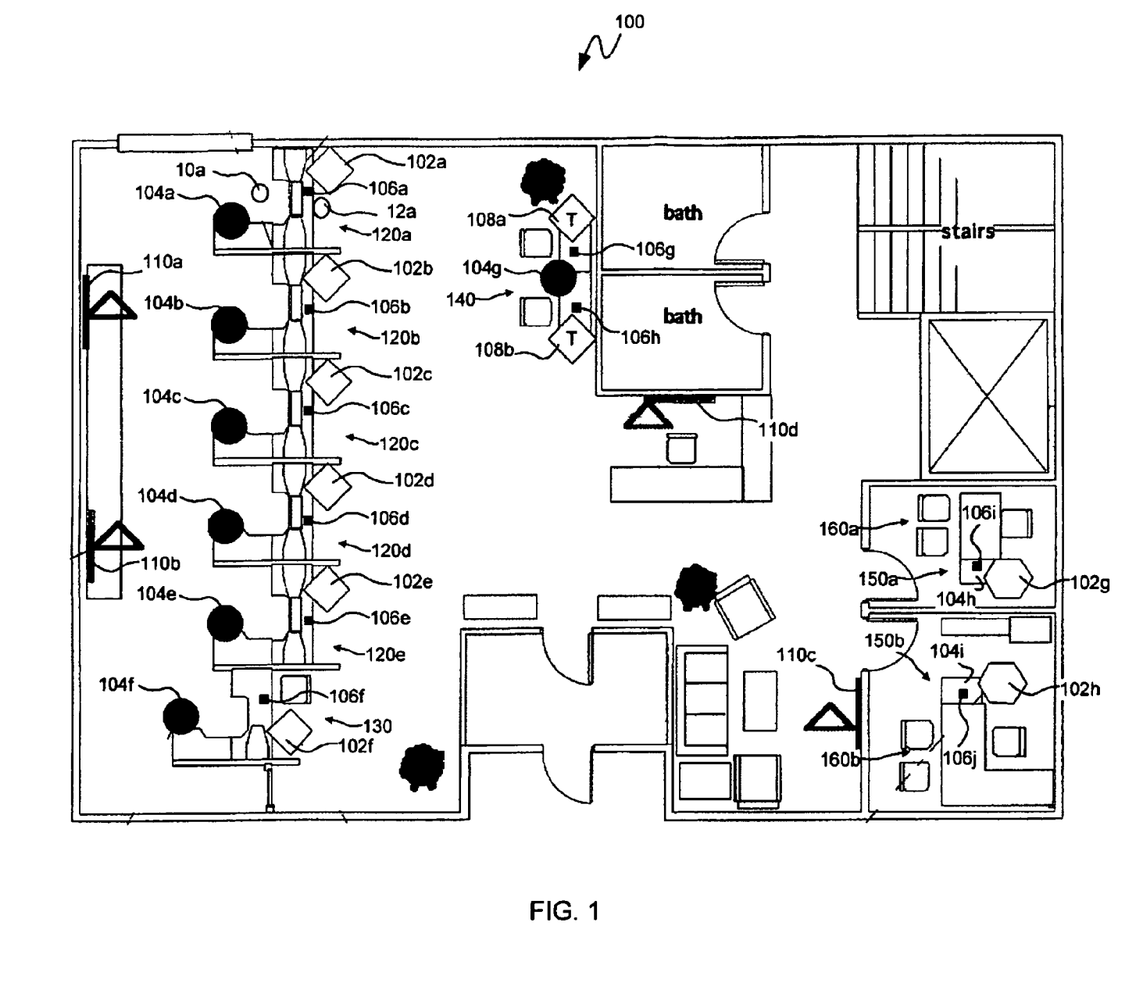
FIG. 1 is a diagrammatic illustration of an office environment including a branch banking customer interaction system, consistent with one embodiment of the present invention.

Referring to FIG. 1, one embodiment of a branch banking customer interaction system 100 is shown and described in detail. The customer interaction system 100 may include various combinations of one or more components in various locations throughout an office environment such as a branch office of a bank. Components may include electronic components that may be used to interact with the customers and office furniture components that may be used to locate the electronic components within the office environment. Electronic components used to interact with customers may include, but are not limited to, customer-oriented displays 102a-102h, printers 104a-104i, electronic signature pads 106a-106j, touch screen displays 108a-108b, and wall displays 110a-110d. Office furniture components may include one or more customer interaction consoles 120a-120e, one or more customer service desks 130, one or more display desks 140, and one or more customer service modules 150a-150b. The components may be arranged in various configurations throughout the office environment to improve the ability to interact with and provide information to customers.

The customer interaction consoles 120a-12e may form a modular and configurable console system, for example, as described in greater detail in co-pending U.S. patent application Ser. No. 11/224724 filed concurrently herewith and fully incorporated herein by reference. The consoles 120a-120e may be arranged in different configurations to provide primary customer interaction locations, for example, teller stations in a bank. The customer interaction consoles 120a-120e may also be arranged in a way that creates customer privacy zones.

One or more of the customer interaction consoles 120a-120e may be provided with customer-oriented displays 102a-102e, printers 104a-104e, and electronic signature pads 106a-106e. A customer service desk 130 may also be provided with a customer-oriented display 102f, a printer 104f, and an electronic signature pad 106f. Display desk 140 may be provided with one or more touch screen displays 108a-108b, one or more printers 104g and one or more electronic signature pads 106g, 106h. Customer service modules 150a-150b may be provided with customer-oriented displays 102g, 102h, printers 104h, 104i, and electronic signature pads 106i, 106j. The customer service modules 150a-150b may be used with desks 160a, 160b (e.g., customer service desks or loan officer desks) that do not include integrated customer-oriented displays, printers and/or electronic signature pads. In the exemplary embodiments, described in greater detail below, one or more of the electronic components may be integrated into the office furniture components. Those skilled in the art will recognize that the electronic components may also be provided in different office furniture components.

The customer-oriented displays 102a-102h may be configured to privately display information to the customer including, but not limited to, teller name and deposit policy, special product offers, advertising for local businesses, customer account information, dynamic and static messages, and other marketing or advertising information. One example of a customer-oriented display is a 15 in. flat screen LED monitor such as the type available from Samsung Electronics under the name SyncMaster. The customer-oriented displays located at customer interaction consoles, customer service desks or customer service modules may be connected to the teller's computer to allow the teller to control information to be displayed to the customer, as will be described in greater detail below.

The printers 104a-104h may be configured to provide on demand printing of materials for the customer including, but not limited to, two-sided color brochures (e.g., with real time rate information), customer specific account information, forms for opening new accounts, special offers, and other marketing materials. Thus, information addressing a specific customer request or need may be efficiently and conveniently printed and provided to the customer at the teller station. On demand printing allows the bank to save on the printing of collateral materials. One example of a printer that may be used for on demand printing is a laser duplex printer capable of providing two sided color brochures, such as the type available from Oki Data under the name OKI C5400.

The electronic signature pads 106a-106i may be configured to capture signatures from customers electronically. Thus, the customers may sign documents such as those needed to purchase additional bank products (e.g., open new accounts, loans, overdraft protection). One example of the electronic signature pad is the type available from Interlink Electronics under the name ePad.

The touch screen displays 108a-108b are configured to receive customer requests for information and to display such information including, but not limited to, product brochures printed on request, account information, loan forms, and local community information. One example of the touch screen display is a 15 in. touch screen LED monitor such as the type available from Samsung Electronics. Information selected and/or created using a touch screen display may also be printed.

The wall displays 110a-110d may be located on the walls in various locations of the office environment to publicly display information to multiple customers in the office. The wall displays 110a-110d may display information including, but not limited to, location specific information, up-to-date product rates, and advertising for the bank or other businesses (e.g., business customers of the bank). One example of the wall display is a large format (e.g., 32 in. or 42 in.) LED display such as the type available from Samsung Electronics. The wall displays 110a-110d may be placed throughout the branch office in specific zones. Wall displays 110a-110b may be placed behind the teller line to display product information, which supports and reinforces cross sales of bank products. A wall display 110c may also be placed in waiting areas to display product, community and other general information. A wall display 110d may also be placed in an area behind a greeter.

According to an exemplary banking customer interaction process, a bank worker 10a interacts with the customer 12a in numerous ways in addition to conducting traditional bank transactions. At a customer interaction console 120a, for example, the bank worker 10a may also provide customer service to the customer 12a, market bank products to the customer 12a, and sell bank products to the customer 12a. The bank worker 10a may be a teller or other individual who is trained to perform these additional customer interactions in addition to the traditional teller transactions. This process may be implemented using the systems and components described herein or using other such systems and components.

Conducting bank transactions may include, but is not limited to, handling deposits and withdrawals and cashing checks. Those skilled in the art will recognize that other customer financial transactions may also be conducted. The bank worker 10a may handle these transactions at the customer interaction console 120a in a manner similar to a traditional bank or other such financial transaction institution.

Providing customer service may include, but is not limited to, assisting the customer 12a with problems involving an existing account. If a problem is discovered when handling a transaction (e.g., insufficient finds), for example, the bank worker 10a may be able to provide customer service (e.g., privately reviewing the account with the customer 12a) without sending the customer 12a to a separate customer service location or representative. Information needed to provide customer service (e.g., account history or other account information) may be displayed directly to the customer 12a (e.g., on the customer-oriented display 102a) as well as to the bank worker 10a (e.g., on a worker side display) to facilitate reviewing the information with the customer 12a. The bank worker 10a may also print statements for the customer 12a (e.g., using the printer 104a) including recent account transactions. Thus, reconciliation of account balances and other customer service issues may be resolved more quickly without having to send the customer to another line to consult with a separate customer service representative (CSR).

Marketing may include, but is not limited to, suggesting bank products, displaying information on bank products, or providing printed materials describing bank products. The information on bank products may be customer-specific bank product information, for example, based upon a previous transaction or customer service activity. If a problem is discovered when handling a transaction (e.g., insufficient funds), for example, the bank worker 10a may be able to offer an appropriate bank product (e.g., overdraft protection) without sending the customer 12a to a separate location or representative in the office. Customer specific marketing material may be presented directly to the customer by a bank worker 10a (e.g., verbally and/or hard copy) or may be displayed directly to the customer (e.g., using the customer-oriented display 102a). The materials may include up-to-date marketing or promotional materials printed on demand. The printed marketing materials may include color brochures or may be printed on the back side of account statements provided to the customer.

Alternatively, the customer-specific bank product information may be based on a customer profile unique to the customer. The bank worker 10a, for example, may review a customer profile and provide the customer specific marketing material to the customer 12a based on the customer profile. Alternatively, the customer specific marketing material may be provided to a customer (e.g., displayed or printed) automatically based on the customer profile.

Non-customer-specific marketing or general advertising material may also be displayed directly to the customer 12a (e.g., on the customer-oriented display 102a). General advertising or marketing material may include advertising for the bank or for others (e.g., for local businesses or business customers of the bank). The general advertising material may be displayed continuously on the customer-oriented display 102a, for example, as a slide show (e.g., using a Microsoft PowerPoint presentation) or a dynamic graphical presentation (e.g., using a Macromedia Flash presentation). General advertising material may also be displayed to individual customers using the touch screen displays 108a-108b and/or to all of the customers using one or more of the wall displays 110a-110d.

Selling bank products may include, but is not limited to, opening new accounts, handling loans, opening investment accounts, and providing other financial services to the customer 12a. The bank product may be associated with a previous customer service activity and/or marketing activity. If a problem is discovered when handling a transaction (e.g., insufficient funds) and the bank worker 10a offers an appropriate bank product (e.g., overdraft protection), the worker may sell the bank product to the customer without sending the customer 12a to a separate location or representative in the office. Information associated with the bank product may be displayed to the customer 12a (e.g., on customer-oriented display 102a) or printed for the customer 12a (e.g., on printer 104a). As described above, bank product information may be printed on the back side of an account statement or as a separate brochure printed on demand.

Also, the bank worker 10a may provide the customer 12a with the appropriate forms, either in hard copy or electronically. The bank worker 10a may complete electronic forms electronically and print the completed forms on demand (e.g., using the printer 104a) at the customer interaction console 120a. Alternatively, these forms may be presented to the customer 12a as "smart" forms (e.g., displayed on the customer-oriented display 102a) and electronically signed by the customer 12a (e.g., using the electronic signature pad 106a). A hard copy of the completed and electronically signed form may then be printed (e.g., using the printer 104a) for the customer 12a.

Figure 2:
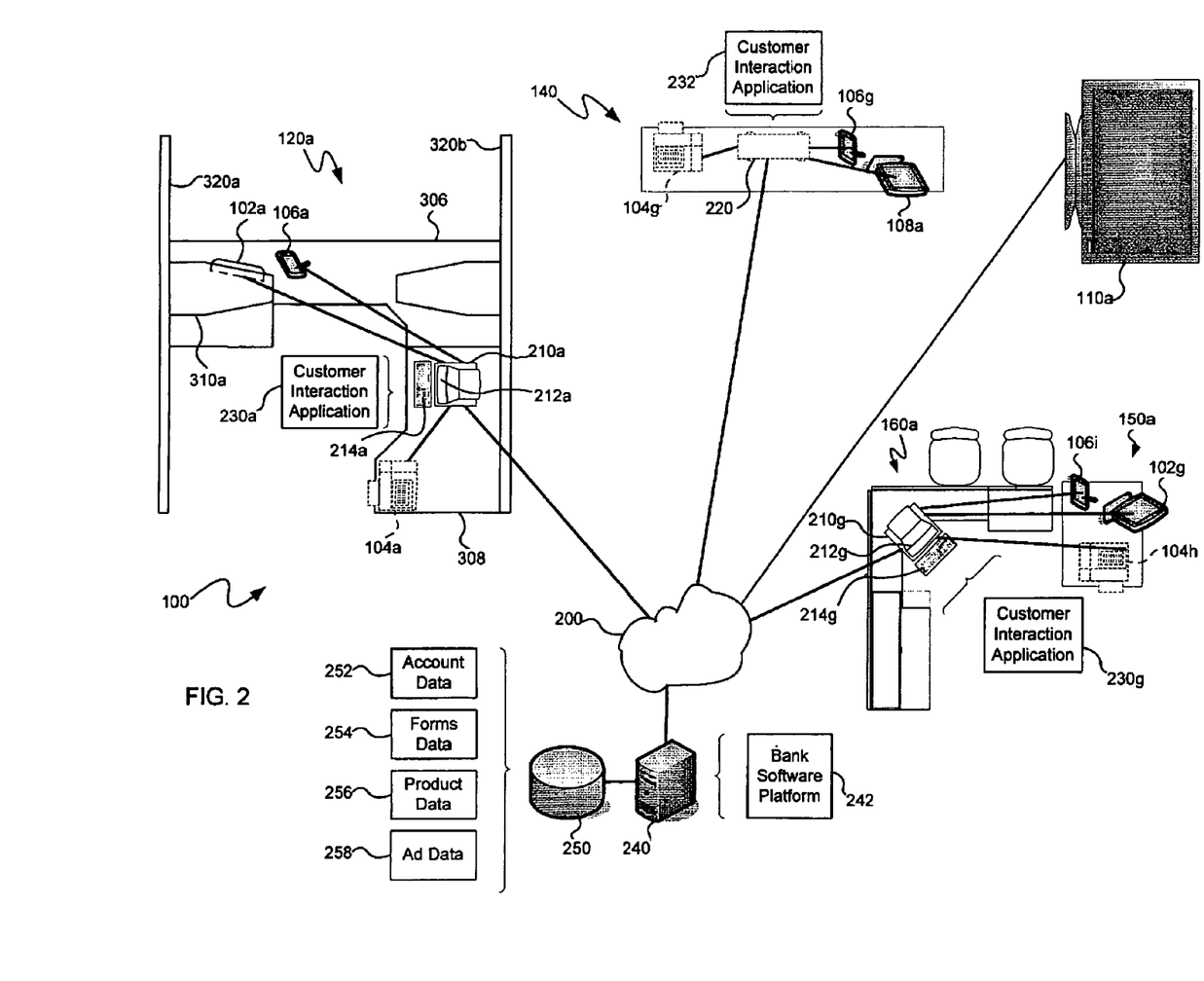
FIG. 2 is a diagrammatic illustration of a branch banking customer interaction system coupled to a computing network, consistent with another embodiment of the present invention.

As shown in FIG. 2, various components of the customer interaction system 100 may be interconnected (e.g., in a computing network) to implement customer interaction processes described in greater detail below. The electronic components used for customer interaction (e.g., the customer-oriented displays, printers, electronic signature pads, touch screen displays, and wall displays) may be coupled, directly or indirectly, to a network 200. The network 200 may include a local area network (LAN), a wide area network (WAN), the Internet, or any combination thereof. The electronic components may be coupled to the network 200 via a hardwired connection (e.g., Ethernet cables) or via a wireless connection (e.g., wireless access points).

At the customer interaction console 120a and the customer service desk 160a, for example, a computer system 210a, 210g may be coupled to the customer-oriented display 102a, 102g, the printer 104a, 104h, and the electronic signature pad 106a, 106i. The computer system 210a, 210g may be a conventional desktop PC or workstation including a computer monitor (i.e., a worker side display 212a, 212g) and user input devices 214a, 214g (e.g., a keyboard and/or a mouse). The computer system 210a, 210g may include a video card configured for connecting to multiple displays (e.g., to the customer-oriented displays 102a, 102g and to the worker side displays 212a, 212g), for example, using a digital video interface (DVI) connection or a visual graphics array (VGA) connection. The printers 104a, 104h and the electronic signature pads 106a, 106i may be coupled to the computer systems 210a, 210g using a peripheral device connection known to those skilled in the art, such as a universal serial bus (USB) port or a serial port included within the computer system 210a, 210g. The computer systems 210a, 210g may be coupled to the network 200, for example, using a hardwired or wireless connection.

At the display desk 140, a computer system 220 may be coupled to the printer 104g, the electronic signature pad 106g, and the touch screen display 108a. The printer 104g and the electronic signature pad 106g may be coupled to the computer system 220 using a peripheral device connection known to those skilled in the art, such as a universal serial bus (USB) port or a serial port. The touch screen display 108a may be coupled to the computer system 220 using a digital video interface (DVI) connection or a visual graphics array (VGA) connection and/or a USB or serial port connection. The computer system 220 may be coupled to the network 200, for example, using a hardwired or wireless connection.

A wall display 108a may be coupled directly or indirectly to the network 200. When the wall display 108a is on the network, a server computer may control the display of information on the wall display. Alternatively, the wall display 108a may be coupled to and controlled by a stand-alone controller (e.g., a computer).

Each of the computer systems 210a, 210g, 220 may execute a customer interaction application 230a, 230g, 232 to handle customer interaction functions and/or to control the electronic devices coupled to the computer systems. The instruction sets and subroutines of the customer interaction applications, which are typically stored on a storage device coupled to the computer system, are executed by one or more processors (not shown) and one or more memory architectures (not shown) incorporated into the computer system. The storage devices may include but are not limited to a hard disk drive, a tape drive, an optical drive, a RAID array, a random access memory (RAM), or a read-only memory (ROM). The computer systems 210a, 210g, 220 may also run an operating system, examples of which may include but are not limited to Microsoft Windows™, or Redhat Linux™.

A server computer system 240 may also be coupled to the network 200. The server computer system 240 may include one or more conventional server computers running a network operating system, examples of which may include but are not limited to Microsoft Windows 2000 Server™, Novell Netware™, or Redhat Linux™. A bank software platform 242 may be executed on the server computer system 240 and/or the computer systems 210a, 210g, 220 to handle various tasks associated with bank transaction processing. Those skilled in the art will recognize that known bank software platforms may be used, such as the type available from Jack Henry & Associates.

A database system 250 may be coupled to the server computer system 240. The database system 250 may include one or more storage devices coupled to or included in the server computer system 240. The data stored on the database system 250 may include, but is not limited to, account data 252, forms data 254, product data 256, and advertising data 258. Other data that may be stored in the database system 250 may include customer profile data, for example, data representing financial or other information associated with a customer such as customer age, account balances, investment portfolios, and existing bank products associated with a customer. The data stored in the database system 250 may also be stored locally on any one of the computers 210a, 210g, 220.

FIG. 2 shows only some of the electronic components shown in FIG. 1 for simplicity. Those skilled in the art will recognize that the other electronic components in the customer interaction system 100 may be similarly coupled and configured.

Figure 3:
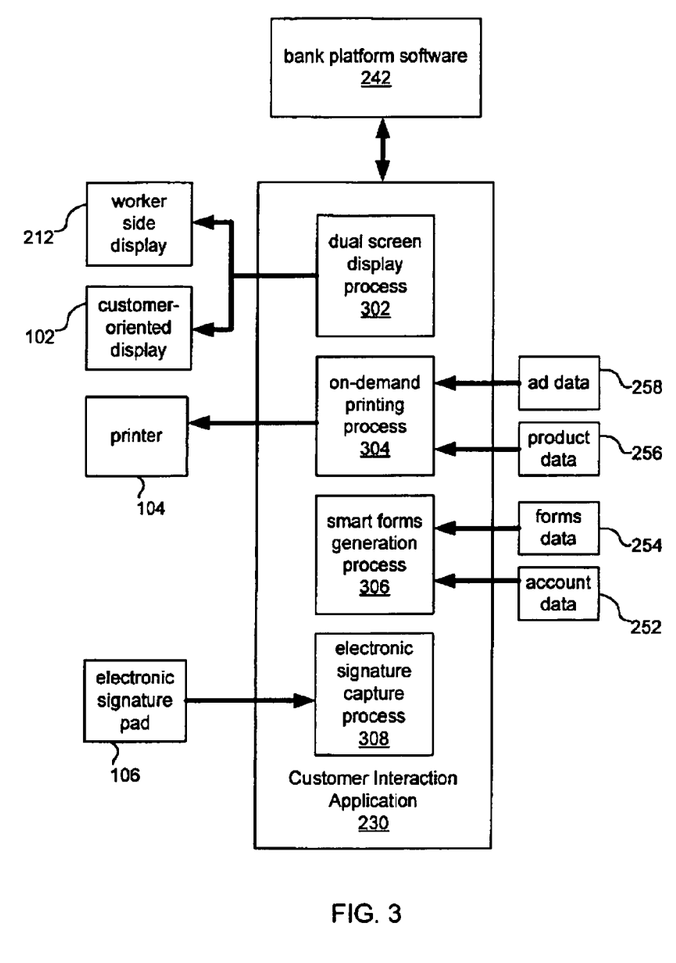
FIG. 3 is a diagrammatic illustration of one embodiment of a customer interaction application, which may be used in the branch banking customer interaction system.

Referring to FIG. 3, the customer interaction application 230 running on a desktop computer may include a dual screen display process 302, an on-demand printing process 304, a smart forms generation process 306, and an electronic signature capture process 308. Each of the processes 302, 304, 306, 308 may include one or more sub-processes and may interact with each other and/or with other processes running on the desktop computers and/or on the server computer.

The dual screen display process 302 may be initiated to cause selected information (e.g. account information or an electronic form) to be displayed both to the bank worker on the worker side display 212 and to the customer on the customer-oriented display 102. In response to a user's selection of data to be displayed on dual screens, the dual screen display process 302 may perform a screen capture of the data displayed on the worker side display 212 and may provide data mirroring of the captured data on the customer-oriented display 102. The dual screen display process 302 may also format the data to be displayed. The dual screen display process 302 may interact with one or more display drivers and/or other processes (not shown) that cause data to be output to the displays 102, 212.

The on-demand printing process 304 may be initiated to cause the printer 104 to print a document, such as an advertisement or brochure, or an account statement with banking product or advertising information on the second side. In response to a users selection of a document to be printed, the on-demand printing process 302 may retrieve data (e.g., from banking product data 256 and/or advertising data 258) used to generate the documents to be printed. The banking product data 256 and the advertising data 258 may include, for example, pre-generated electronic documents (e.g., pdf files) and/or the text and graphics used to generate the documents to be printed. The on-demand printing process 304 may interact with one or more printer drivers and/or other processes (not shown) that cause data to be output to the printer 104.

The smart forms generation process 306 may be initiated to automatically generate a form, for example, used to purchase or secure a bank product or service. Upon receiving a user selection of a form or a product or service requiring a form, the smart forms generation process 306 may retrieve the appropriate data (e.g., from forms data 254) used to generate the form. The smart forms generation process 306 may also retrieve customer information (e.g., from customer account data 252) and may merge customer information (e.g., customer name and address) from the account data with the forms data for a particular type of form.

The electronic signature capture process 308 may be initiated to cause an electronic signature pad 106 to capture a customer's signature and to generate a digital data representation of the captured signature. The electronic signature capture process 308 may also associate the captured electronic signature with the customer account or with a generated form. The electronic signature capture process 308 may interact with one or more device drivers and/or other processes (not shown) that cause data to be input from the electronic signature pad 106.

The customer interaction application 232 running on the computer system 220 (FIG. 2) may also include an on-demand printing process, a smart forms generation process, and an electronic signature capture process, as described above. The customer interaction application 232 may further include additional customer interaction processes that allow a customer to access and retrieve information (e.g., account information or banking product information) using a touch screen display. The customer interaction application 232 may interact with one or more device drivers and/or other processes (not shown) that cause data to be input from and output to the touch screen display.

The customer interaction application 230 may also include other processes for handling other customer interaction tasks including, but not limited to, presenting customer profiles to the bank worker at the customer interaction console and/or recommending new products based on the customer profile. The customer interaction application 230 may also include a process that acts as an information manager to coordinate messages presented throughout the branch office. The customer interaction application 230 may also interface with the bank software platform 242.

The customer interaction application 230 may also include a process for generating a presentation of general advertising or marketing material on the customer oriented display, for example, using a Microsoft PowerPoint presentation or a Macromedia Flash presentation. One or more presentation files may be stored in the database system 250 or stored locally on a computer 210a, 210g, 220.

Embodiments of the software can be implemented as a computer program product for use with a computer system. Such implementation includes, without limitation, a series of computer instructions that embody all or part of the functionality previously described herein with respect to the system and method. The series of computer instructions may be stored in any machine-readable medium, such as semiconductor, magnetic, optical or other memory devices, and may be transmitted using any communications technology, such as optical, infrared, microwave, or other transmission technologies. It is expected that such a computer program product may be distributed as a removable machine-readable medium (e.g., a diskette, CD-ROM), preloaded with a computer system (e.g., on system ROM or fixed disk), or distributed from a server or electronic bulletin board over the network (e.g., the Internet or World Wide Web).

Those skilled in the art should appreciate that such computer instructions can be written in a number of programming languages for use with many computer architectures or operating systems. For example, preferred embodiments may be implemented in a procedural programming language (e.g., "C") or an object oriented programming language (e.g., "C++" or Java). Alternative embodiments of the invention may be implemented as pre-programmed hardware elements or as a combination of hardware and software.

Figure 4:
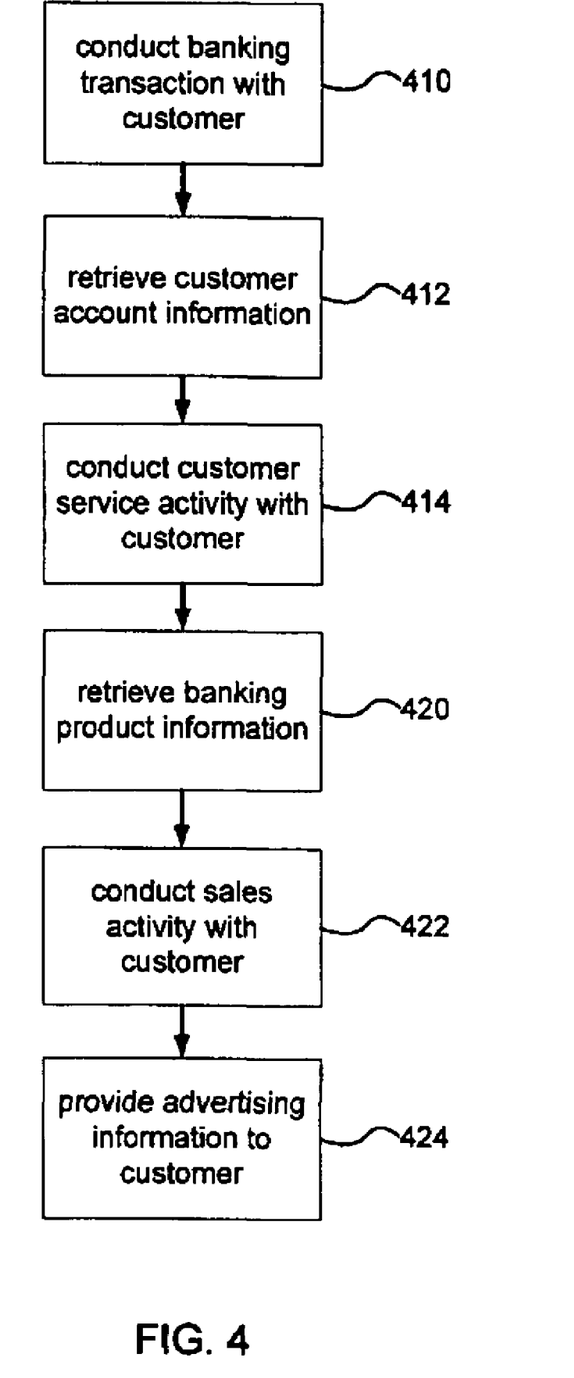
FIG. 4 is a flow chart illustrating a customer interaction process, consistent with one embodiment of the present invention.

Referring to FIG. 4, one method of customer interaction is illustrated and described. Consistent with this method, a bank worker may conduct 410 a banking transaction with the customer, for example, at the customer interaction console. The bank worker may retrieve 412 customer account information associated with the customer (e.g., using the desktop computer at the customer interaction console) and may conduct 414 one or more customer service activities using the retrieved account information. To conduct the customer service activity, for example, the dual screen display process 302 (FIG. 3) may be used to display the retrieved account information on both the customer-oriented display 102 and on the worker side display 112.

The bank worker may also retrieve 420 banking product information associated with one or more banking products and/or services (e.g., using the desktop computer at the customer interaction console) and may conduct 422 a sales activity to sell the banking product(s) to the customer at the customer interaction console. To conduct the sales activity, the on-demand printing process 304 (FIG. 3) may be used to print information on banking products, the smart forms generation process 306 may be used to generate any necessary forms to sell the banking products, and the electronic signature capture process 308 may be used to capture any necessary customer transactions to complete the sale.

The bank worker or the bank may further provide 424 advertising information to the customer. To provide advertising information, the on-demand printing process 304 (FIG. 3) may be used to print brochures for the customer or to print advertisements on the reverse side of account statements. Alternatively, general advertising material may be displayed directly to a customer (e.g., on a customer-oriented display at the console or on a touch screen display at the display desk) or to all customers (e.g., on a wall display).

Figure 5:
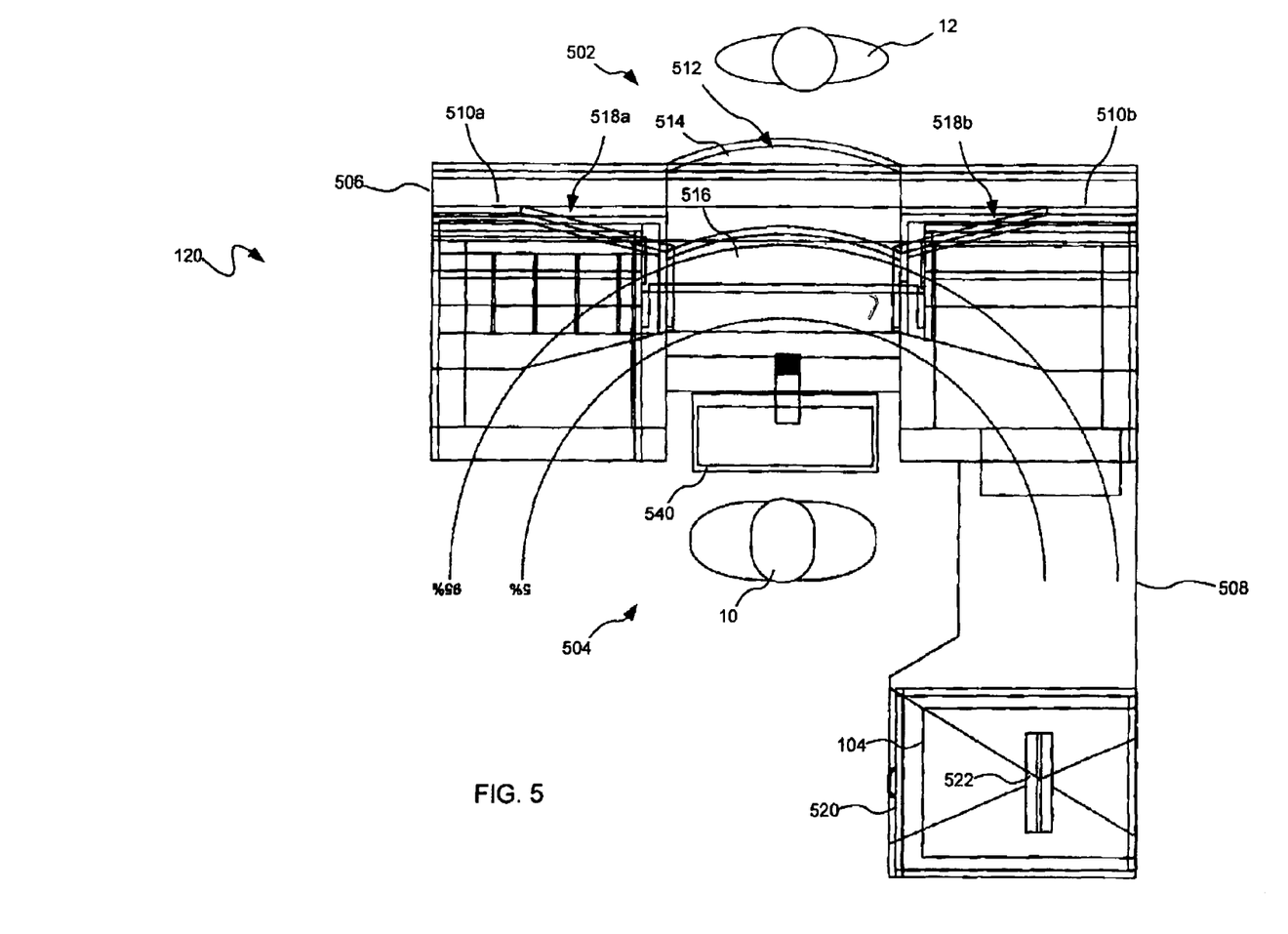
FIG. 5 is plan view of one embodiment of a customer interaction console, which may be used in a branch banking customer interaction system.
Figure 6:
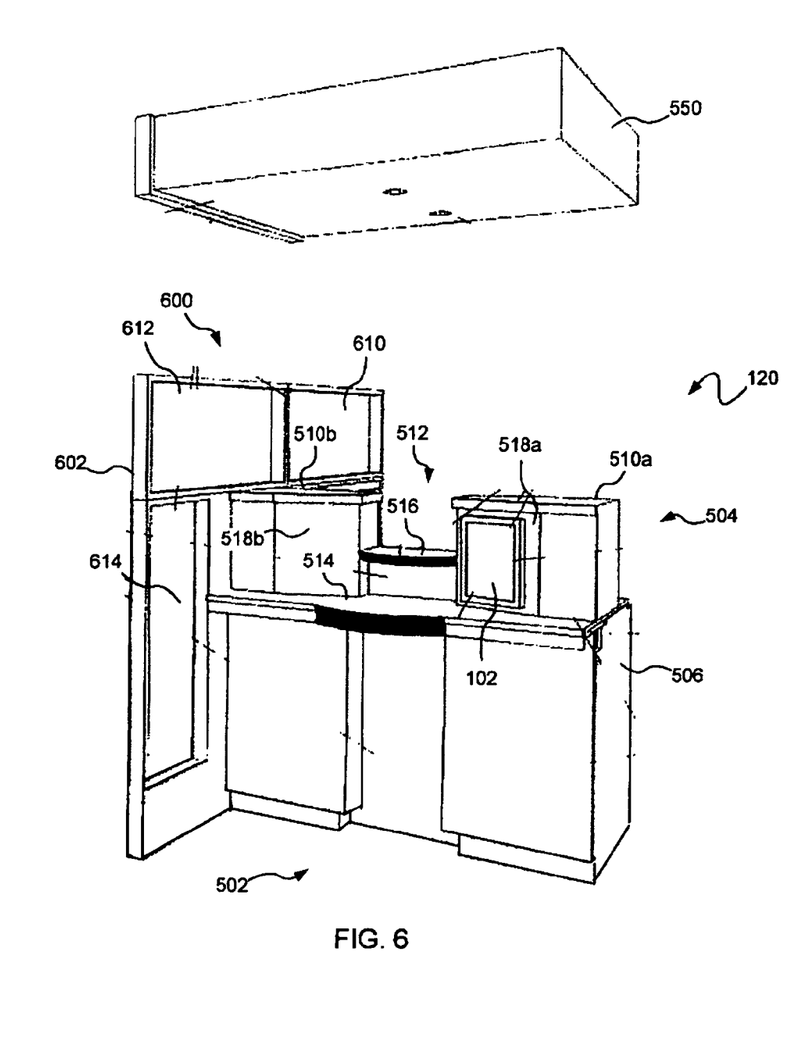
FIGS. 6 and 7 are perspective views of a customer side and a worker side, respectively, of a customer interaction console, consistent with additional embodiments of the present invention.
Figure 7:
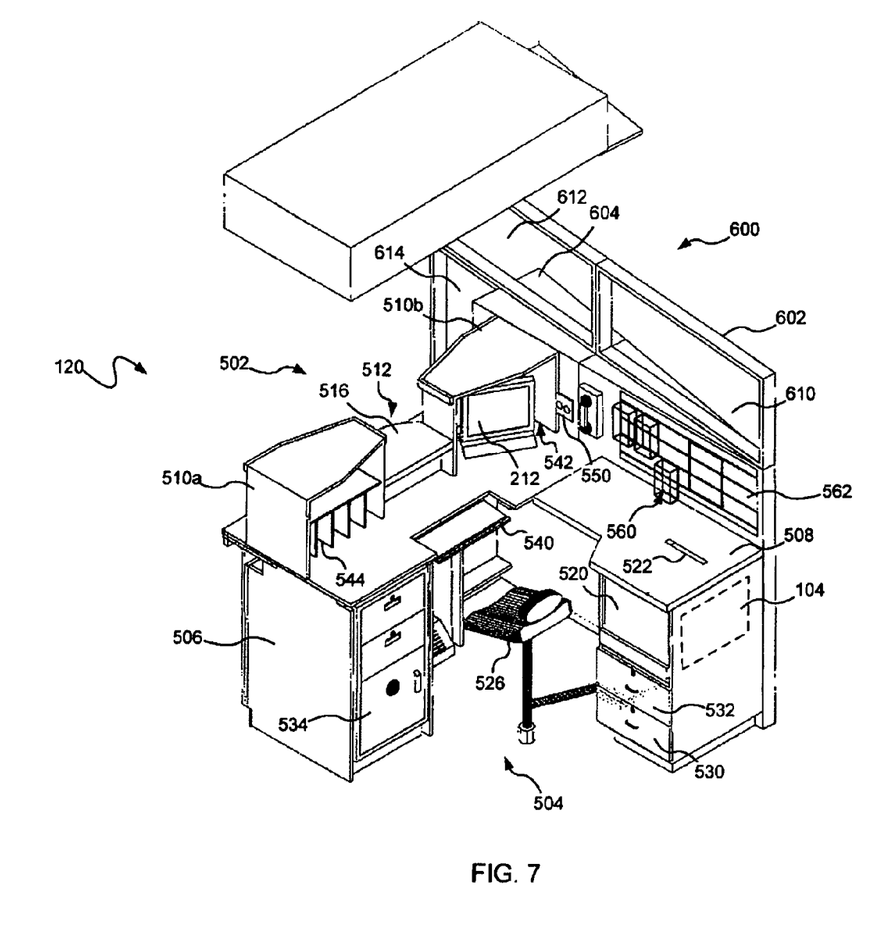

Referring to FIGS. 5-7, embodiments of the customer interaction console 120 are shown in greater detail. The customer interaction console 120 generally has a customer side 502 (shown in FIG. 2) and a worker side 504 (shown in FIG. 2). The customer interaction console 120 may include a counter module 506 and a side or return module 508. A customer 12 may stand at a customer's location on the customer side 502 of the counter module 506. The return module 508 may extend generally perpendicular from either side of the counter module 506 (shown in FIGS. 2-3 on the worker's right hand side). The customer interaction console 120 may also include return modules 508 on both sides (not shown) of the counter module 506.

The counter module 506 may include raised counter portions 510a, 510b on either side of a customer interaction area 512 at the customer's location. The counter module 506 may also include a lower customer counter surface 514 and a higher customer counter surface 516 between the raised counter portions 510a, 510b. In the customer interaction area 512, the lower customer counter surface 514 and the higher customer counter surface 516 may have rounded edges. The counter module 506 may include a light source (not shown), such as a low voltage light source, under the front edge of the higher customer counter surface 516. The lower customer counter surface 514 may also extend in front of the raised counter portions 510a, 510b. The raised counter portions 510a, 510b may have angled surfaces 518a, 518b angled inwardly toward the customer interaction area 512.

In one example, the counter module 506 may have a width of about 5 feet to 6 feet and a depth of about 2 feet 6 inches. The raised counter portions 510a, 510b may each have a width of about 2 feet and the customer interaction area 512 may be centrally located with a width of about 2 feet. The lower customer counter surface 514 may have a height of about 3 feet 4 inches from the ground and the raised counter portions 510a, 510b may have a height of about 4 feet 10 inches from the ground. An exemplary return module 508 may extend about 3 feet 6 inches from the counter module 506 and may have a width of about 1 foot 6 inches. Although the exemplary customer interaction console 120 is shown and described with specific dimensions, those skilled in the art will recognize that the customer interaction console may have different dimensions, shapes and configurations.

According to one embodiment, the customer interaction console 120 may include the integrated customer-oriented display 102 (FIG. 6). The customer-oriented display 102 may be incorporated in one of the raised counter portions 510a, 510b, for example, in one of the angled surfaces 518a, 518b, such that the customer-oriented display 102 is angled toward a customer location. Angling of the customer-oriented display 102 allows information to be displayed privately to the customer.

According to one embodiment, the customer interaction console 120 may include the integrated printer 104. The return module 508 may include a sliding tray 520 for housing the printer 104 and slot 522 for allowing printed materials to be retrieved by a worker. The sliding tray 520 allows maintenance access to the printer 104.

According to one embodiment, the customer interaction console 120 may also include an integrated chair 526, for example, coupled to the counter module 506 or to the return module 508. The chair 526 may be pivotably mounted to the console 120 allowing the chair 526 to be moved to a storage position, for example, beneath the counter module 506 or the return module 508 (FIG. 4). One example of the chair 526 is A multi-position chair described in greater detail in co-pending U.S. patent application Ser. No. 11/224725 which is filed concurrently herewith and fully incorporated herein by reference.

The customer interaction console 120 may also include other optional features. The customer interaction console 120 may include one or more drawers 530, 532 in the counter module 506 and/or the return module 508. The customer interaction console 120 may also include undercounter steel 534. Alternatively, the customer interaction console 120 may include cash dispensing systems instead of typical undercounter steel, for example, to eliminate tedious and monotonous routines and to improve transaction times. Software may be used to track the cash usage and a head teller (or other bank worker) can be notified when a station has cash needs prior to requiring a vault call, thereby avoiding wasting the customer's time.

The customer interaction console 120 may also include an articulating keyboard tray 540 for holding a computer keyboard and a recessed corner area 542 (e.g., under raised counter portion 110b) for accommodating a flat panel monitor (e.g., the worker side display 212). The customer interaction console 120 may further include storage and/or organizers 544, for example, under the other raised counter portion 510a. The customer interaction console 120 may further include individual light and heater controls 550 for controlling lights and a heater associated with the individual customer interaction console 120. The customer interaction console 120 may also include one or more forms/documents holders 560 for holding forms and/or documents. The light and heater controls 550 and the forms/documents holders 560 may be located on a side surface 562 adjacent to the return module 508, for example, on a privacy panel or wedge portion discussed below.

The customer interaction console 120 discussed above may be designed based on the teller's individual needs relative to temperature, lighting, noise factors, humidity, air quality, and physical accommodations. The customer interaction console 120 may also be designed based on other ergonomic variables such as workplace height, computer placement (keyboard and monitor), seating, and placement of teller cash drawers and forms and other frequently accessed items. The customer interaction console 120 may be customizable to accommodate these different considerations.

A privacy panel assembly 600 may be positioned between one or more of the customer interaction consoles 100 to provide privacy and to form a configurable console system. The privacy panel assembly 600 may include a privacy panel 602 with or without a wedge portion 604. The privacy panel 602 may extend beyond the customer side 502 of the console 120 and above the console 120 to prevent the voices of the employees and/or customers from carrying over to an adjacent customer transaction location. The privacy panels 602 may include one or more glass panels 610, 612, 614, such as ¼ inch safety glass, to allow light to flow through.

The customer service desk 130 (FIG. 1) may be similar to the customer interaction consoles 120 but at a lower height. The customer service desk 130 may include only one raised counter portion including the integrated customer-oriented display 102*f*. According to another embodiment of the customer service desk 130, the customer service desk 130 may include an executive desktop without a raised counter portion and a customer-oriented display supported by an ergonomically adjustable support arm.

The display desk 140 (FIG. 1) may include a counter to provide a large writing surface and a raised back panel. The electronic signature pads 106*g*, 106*h* may be integrated into the counter, and the touch screen displays 110*a*, 110*b* may be integrated into the raised back panel. The display desk 140 may also include a slide-out printer tray to house the printer 104*g*. The display desk 140 may be wired, for example, with data and power lines, to facilitate use with the electronic components. The display desk 140 may also include one or more drawers for storing a computer and/or paper and supplies. The display desk 140 may also have the capabilities of a traditional check desk.

Figure 8:
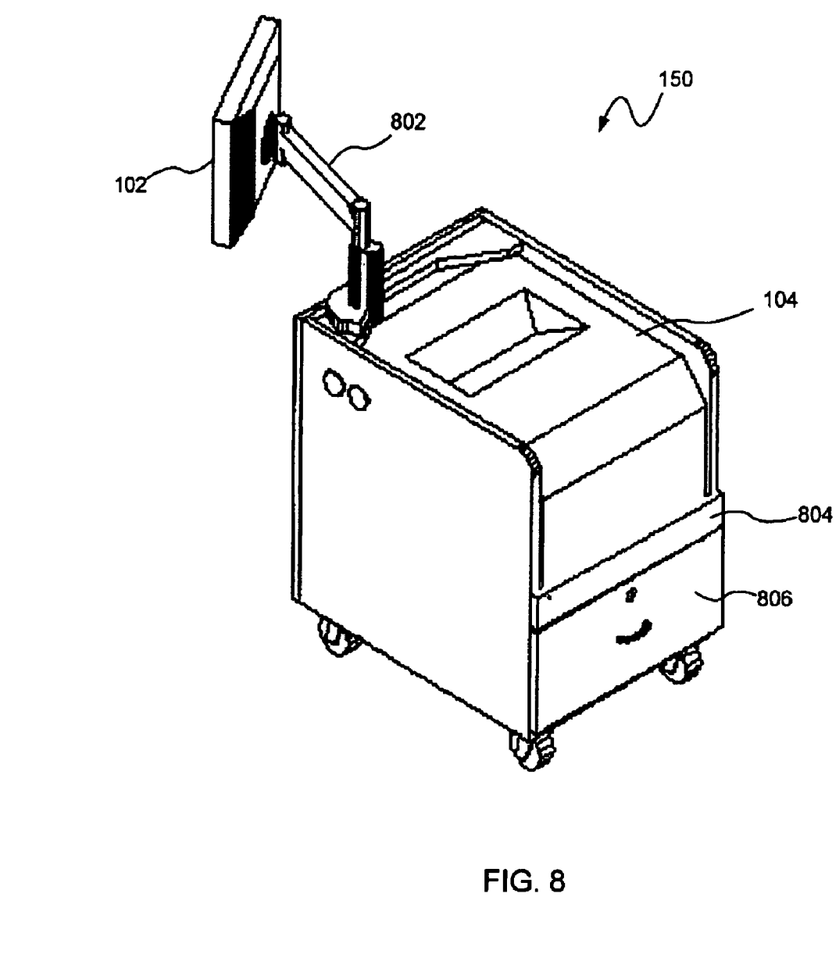
FIGS. 8 and 9 are perspective views of one embodiment of a customer service module, which may be used in a branch banking customer interaction system.
Figure 9:
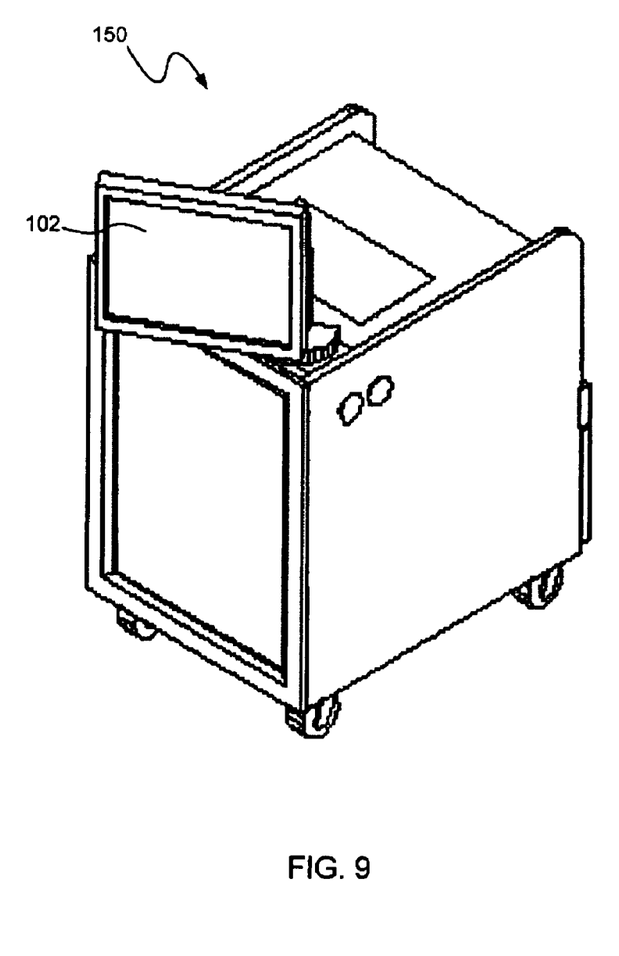

As shown in FIGS. 8 and 9, one embodiment of the customer service module 150 includes the customer-oriented display 102 such as an LED monitor and the printer 104 incorporated into a portable, self-contained unit. The customer service module 150 may be located at a customer service desk, for example, in an office having a separate customer service representative. The customer-oriented display 102 may be supported by an ergonomically adjustable support arm 802 to hold the display 102 facing a customer. The customer service module 150 may include a slide-out printer tray 804 to hold the printer 104 and one or more drawers 806 to hold a computer and/or to store paper and supplies. The customer service module 150 may be wired to connect the display 102 and the printer 104 to a computer at the customer service desk to allow the customer service representative to cause selected information to be displayed to the customer on the display 102 and to print materials for the customer on the printer 104. The customer service module 150 may also include a customer writing surface to sign documents and/or to support an electronic signature pad (not shown). The electronic signature pad may sit on the writing surface or may be integrated into the writing surface.

In summary, embodiments of the present invention include banking customer interaction processes and systems. Consistent with one embodiment of the invention, a banking customer interaction process includes: conducting at least one banking transaction with at least one customer at a customer interaction console; retrieving customer account information associated with the customer at the customer interaction console, wherein the customer account information is retrieved from a computer system accessible from the customer interaction console; conducting at least one customer service activity with the customer at the customer interaction console using the customer account information; retrieving banking product information associated with at least one banking product, wherein the banking product information is retrieved from the computer system accessible from the customer interaction console; conducting at least one sales activity with the customer at the customer interaction console using the banking product information; and providing advertising information to the customer at the customer interaction console.

Consistent with another embodiment of the present invention, a banking customer interaction process includes conducting at least one banking transaction with at least one customer at a customer interaction console; conducting at least one customer service activity with at least one customer at the customer interaction console; conducting at least one banking product sales activity with at least one customer at the customer interaction console; and conducting at least one marketing activity with at least one customer at the customer interaction console.

Consistent with a further embodiment of the present invention, a branch banking customer interaction system comprises at least one customer interaction console located within a branch bank office. A customer-oriented display is located on a customer side of the console and is configured to display information only to a customer at a customer location at the console. A bank worker display is located on the bank worker side of the console and is configured to display information to the bank worker. A printer is located on the bank worker side of the console and is configured to provide on-demand printing of bank related documents for the customer. At least one computer system is coupled to the customer-oriented display, the bank worker display and the printer and is configured to store the information to be displayed and printed.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A banking customer interaction process for providing a face-to-face interaction between a bank worker physically located on a bank worker side of a customer interaction console and at least one customer physically located on a customer side of the customer interaction console, the process comprising:

conducting at least one banking transaction with at least one customer at the customer interaction console, the banking transaction being conducted by the bank worker physically located on the bank worker side of the customer interaction console interacting in a face-to-face arrangement across a customer interaction area of said customer interaction console with the customer physically located on the customer side of the customer interaction console;

retrieving customer account information associated with said at least one customer at said customer interaction console, wherein said customer account information is retrieved by the bank worker from a computer system accessible from said customer interaction console;

conducting at least one customer service activity with said at least one customer at said customer interaction console using said customer account information, the customer service activity being conducted by the bank worker physically located on the bank worker side of the customer interaction console interacting in a face-to-face arrangement across a customer interaction area of said customer interaction console with the customer physically located on the customer side of the customer interaction console;

retrieving banking product information associated with at least one banking product, wherein said banking product information is retrieved by the bank worker from said computer system accessible from said customer interaction console;

conducting at least one sales activity with said at least one customer at said customer interaction console using said banking product information, the sales activity being conducted by the bank worker physically located on the bank worker side of the customer interaction console interacting in a face-to-face arrangement across a customer interaction area of said customer interaction console with the customer physically located on the customer side of the customer interaction console;

providing advertising information to said at least one customer at said customer interaction console; and displaying information to said customer on a customer-oriented display viewable only by said at least one customer at said customer interaction console.

2. The process of claim 1 further comprising displaying said customer account information on said customer-oriented display viewable only by said at least one customer at said customer interaction console.

3. The process of claim 2 wherein retrieving said customer account information comprises displaying said customer account information on a bank worker display viewable by said bank worker.

4. The process of claim 1 wherein retrieving said customer account information comprises printing said customer account information on a bank worker printer at said customer interaction console.

5. The process of claim 1 wherein conducting said customer service activity includes reviewing said account information with said customer.

6. The process of claim 1 wherein retrieving said banking product information comprises displaying said banking product information on a bank worker display viewable by said bank worker at said customer interaction console.

7. The process of claim 1 wherein retrieving said banking product information comprises printing said banking product information on a bank worker printer within a range of said bank worker at said customer interaction console.

8. The process of claim 1 wherein said banking product to be sold to said customer is associated with said customer service activity.

9. The process of claim 1 wherein conducting said at least one sales activity comprises providing said customer at said customer interaction console with at least one form associated with said banking product to be sold to said customer.

10. The process of claim 9 wherein providing said customer at said customer interaction console with said at least one form includes electronically displaying said form on said customer-oriented display.

11. The process of claim 10 wherein conducting said at least one sales activity comprises receiving an electronic signature to be associated with said form.

12. The process of claim 1 wherein providing said advertising information includes displaying said advertising information on said customer-oriented display viewable by said at least one customer at said customer interaction console.

13. The process of claim 1 wherein providing said marketing information includes displaying said advertising information on a wall-mounted display viewable by multiple customers in a bank branch office.

14. The process of claim 13 wherein said advertising information comprises advertisements associated with business customers of a bank.

15. The process of claim 1 wherein providing said advertising information comprises printing customer-specific advertising information on a printer at said customer interaction console.

16. The process of claim 1 wherein said advertising information comprises brochures associated with banking products.

17. The process of claim 1 further comprising displaying at least one of account information and banking product information to a customer using a touch screen display.

18. A banking customer interaction process for providing face-to-face interaction between a bank worker physically located on a bank worker side of a customer interaction console and at least one customer physically located on a customer side of the customer interaction console, the process comprising:

conducting at least one banking transaction with at least one customer at the customer interaction console, the banking transaction being conducted by a bank worker physically located on the bank worker side of the customer interaction console interacting in a face-to-face arrangement across a customer interaction area of said customer interaction console with the customer physically located on the customer side of the customer interaction console;

conducting at least one customer service activity with at least one customer at said customer interaction console, the customer service activity being conducted by the bank worker physically located on the bank worker side of the customer interaction console interacting in a face-to-face affangement across a customer interaction area of said customer interaction console with the customer physically located on the customer side of the customer interaction console, wherein conducting said customer service activity comprises displaying customer account information on both a worker side display on a worker side of said customer interaction console and a customer-oriented display on a customer side of said customer interaction console;

conducting at least one marketing activity with at least one customer at said customer interaction console;

conducting at least one banking product sales activity with at least one customer at said customer interaction console, the banking product sales activity being conducted by the bank worker physically located on the bank worker side of the customer interaction console interacting in a face-to-face arrangement across a customer interaction area of said customer interaction console with the customer physically located on the customer side of the customer interaction console; and wherein the banking transaction, the customer service activity, said marketing activity and said banking product sales activity are all conducted at a single location.

19. The banking customer interaction process of claim 18 wherein conducting at least one banking sales activity comprises selling a banking product based on said customer service activity.

20. The banking customer interaction process of claim 18 wherein conducting said marketing activity comprises displaying advertising information to said customer on a customer-oriented display.

21. The banking customer interaction process of claim 20 wherein said advertising information is associated with banking products.

22. The banking customer interaction process of claim 18 wherein conducting said marketing activity comprises displaying advertising information to said customer on a wall display.

23. The banking customer interaction process of claim 22 wherein said advertising information is associated with a business customer of a bank.

24. The banking customer interaction process of claim 18 wherein conducting said marketing activity comprises printing a brochure for a bank product.

25. A branch banking customer interaction system comprising:

at least one customer interaction console located within an office, said customer interaction console including a bank customer side and a bank worker side on opposite sides of said customer interaction console and a customer interaction area located between the bank customer side and the bank worker side, wherein the customer interaction console is configured to allow a bank customer on the bank customer side to face a bank worker on the bank worker side of the customer interaction console in a direct face-to-face arrangement across the customer interaction area;

a customer-oriented display located on said customer side of said console and directed at a bank customer location on said customer side, said customer-oriented display being configured to display information only to a bank customer at the customer location at said console, said information including customer account information and banking product information;

a bank worker display located on said worker side of said console and directed at a bank worker location on said bank worker side, said worker display being configured to display at least customer account information to said bank worker separate from said customer-oriented display displaying information to said bank customer;

a printer located on said bank worker side of said console, said printer being configured to provide on-demand printing of documents for the bank customer; and at least one computer system coupled to said customer-oriented display, said worker display and said printer, said at least one computer system being configured to execute a bank customer interaction application and being configured to store said information to be displayed and printed.

26. The branch banking customer interaction system of claim 25 further comprising at least one customer service module located at a customer service location within said office separate from said customer interaction console, said customer service module comprising a customer display configured to display information to a customer and a printer configured to provide on-demand printing.

27. The branch banking customer interaction system of claim 25 further comprising at least one wall display mounted on at least one wall of said office, said wall display being configured to display at least marketing information.

28. The branch banking customer interaction system of claim 25 further comprising at least one touch screen display and at least one printer located in a customer information area in location within said office separate from said customer interaction console.

29. The branch banking customer interaction system of claim 25 further comprising an electronic signature capture device located on said customer side of said console, said electronic signature capture device being configured to electronically capture a signature of the customer.

* * * * *